July 5, 1938.   M. KAHN   2,122,649
STEREOSCOPIC VIEWER
Filed April 12, 1937
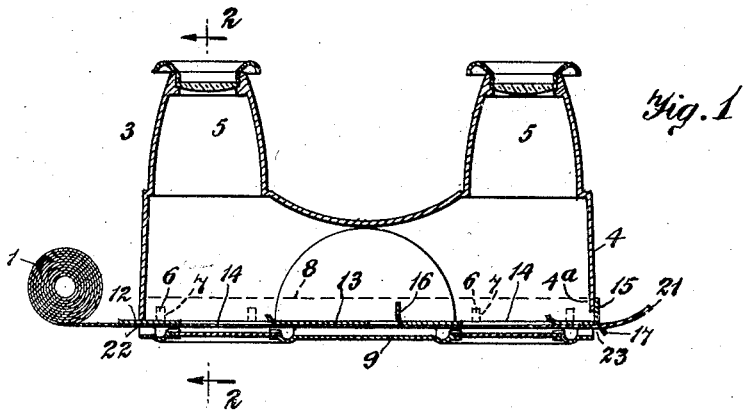
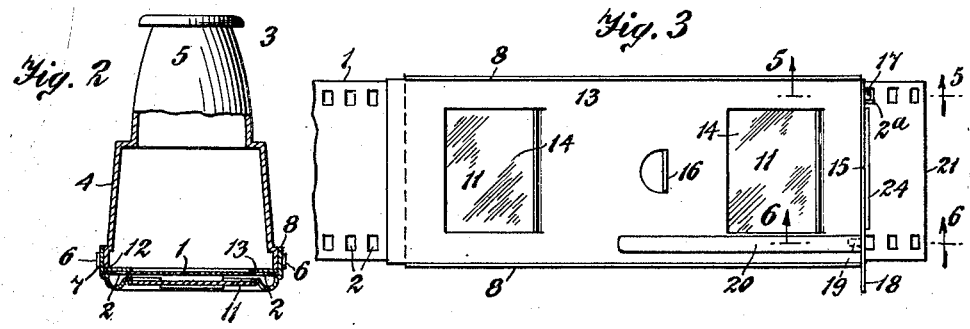
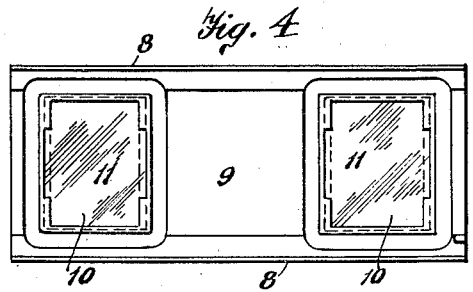
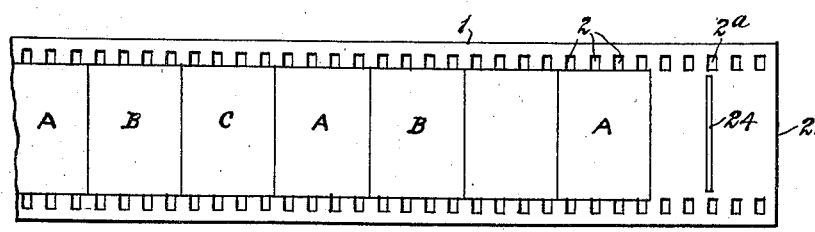
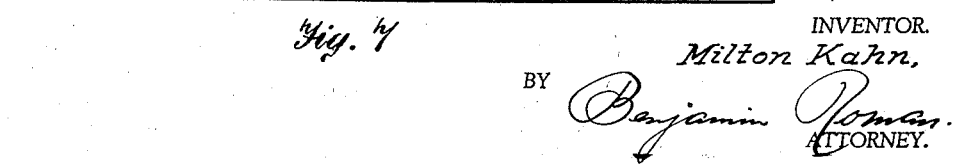
INVENTOR.
Milton Kahn,
BY
ATTORNEY.

Patented July 5, 1938

2,122,649

UNITED STATES PATENT OFFICE 2,122,649

STEREOSCOPIC VIEWER

Milton Kahn, New York, N. Y.

Application April 12, 1937, Serial No. 136,372

4 Claims. (Cl. 88—31)

This invention relates to hand-held stereoscopic viewers of the type wherein there is utilized a perforated film tape having therealong a series of pairs of stereoscopic images. The viewing device embodies a pair of binoculars and windows, and the film is threaded through the device to bring said images in registry with the windows.

One of the objects of the invention is to provide a simplified, economically manufacturable and salable, efficiently utilizable and operable, and improved device wherewith to view the stereoscopic pictures upon a film tape.

Another object is to provide a device of the above type having simplified and improved means for propelling and resting said film tape while viewing the pictures.

A further object is to provide a simplified device of the said type with improved means for positively registering the complementary pairs of the images with said windows.

Other objects and advantages will hereinafter appear.

In the accompanying drawing,—

Fig. 1 shows a longitudinal cross-sectional elevation of the stereoscopic viewer of this invention.

Fig. 2 is a transverse-sectional elevation of the viewing device shown in Fig. 1.

Fig. 3 is an interior plan view of the actuable frame and film guiding plate of the viewing device.

Fig. 4 is an exterior plan view of the film guiding plate.

Figs. 5, 6 are longitudinal cross-sectional elevations showing portions of the film actuating frame and guiding plate illustrated in Fig. 3.

Fig. 7 is a plan view of a stereoscopic image film utilized with this invention.

The film 1, Fig. 7, is preferably of standard cinematic dimensions, with standard perforations 2, and has printed therealong in series a plurality of photographic complementary pairs of stereoscopic images A, B, C, etc., as shown. The viewing device 3 comprises a casing 4 configurated to form binoculars 5, and provided with teeth 6 over which are sprung, by means of holes 7, the upright attaching walls 8 of a receiving and guiding plate 9 for said film, the said plate having a pair of windows 10 registering with said binoculars and carrying translucent light-dispersing panes 11. Between the plate 9 and the bottom edges 12 of casing 4, and guided laterally by the plate-walls 8, is located a frame 13, comprising a pair of windows 14 that register with the windows 10, a stopping plate 15 at its terminal, a limiting projection 16, and a tooth 17, the plate 15 extending outwardly to form a finger-piece 18 wherewith to manipulate the frame 13 which is thus slidable longitudinally outwardly from the film-guiding plate 9, toward the right as viewed in the drawing, and backwardly. The outward stroke of frame 13 is limited by abutment of its projection 16 against the casing portion 4a, while its return or inward stroke is stopped by its plate 15 striking the exterior of casing-portion 4a, the said stroke being equal to the distance of two film images, as will be hereinafter shown. The film guiding plate 9 is provided at its terminal with an upwardly projecting tooth 19, which extends in a groove 20 of frame 13 so as not to impede the latter during its stroke.

The film 1 is threadable through the device 3, by its terminal 21 entering at end 22 and the film passing between the guiding plate 9 and frame 13, and emanating at end 23 of the device, the film being usually in the curled condition shown in Fig. 1 and provided with a printed guiding line 24, Fig. 7. When the film is thus initially threaded through the device, its line 24 is made to stop at its registry with the frame-wall 15, and thereupon the downwardly projecting tooth 17 of frame 13 enters one of the perforations 2a of the film and thereby engages the latter. Simultaneously with this initial engagement of the film 1, its leading complementary pair of images A—A become aligned with the windows 10, and the first stereoscopic picture of the film may be then viewed by the user through the binoculars 5. Upon now grasping the finger-piece 18 to therewith draw the frame 13 outwardly and then returning it inwardly the engaged film is thereby propelled and the next complementary pair of images B—B are presented to view, and by actuating the frame 13 in this manner all of the pictures of the film may be viewed fully and effectively. At the termination of the outward stroke of the frame 13 and propulsion of the film the tooth 19 of guiding plate 9 enters and engages a film-perforation 2b thereat, and upon return of the frame its tooth 17 disengages from the perforation 2a, this engagement action of the tooth 19 serving to retain the film against any accidental dislocation toward the left due to possible frictional action of the frame 13 during its return stroke. The teeth 17, 19 are so configurated, as indicated, that during return stroke of the frame 13 the tooth 17 passes readily over the line of perforations of the arrested film until coming to a stop and engaging with a subsequent perforation 2a, and during propulsion of the film the tooth 19 similarly passes under the line of perforations until engagement with a subsequent perforation 2b.

The image areas are so arranged upon the film that between the units comprising each complementary pair thereof are located two similar areas belonging to different pairs of images, and it is required that the film be advanced to a distance of two of the areas in order to bring the succeeding picture to view. At each of the images is formed a multiple of four perforations 2 comprising the continuity of the perforation line, as shown. The stroke of the frame 13, or propulsion stroke of the film, therefore, is equal to the length of two images or extent of eight perforations of the film.

Variations may be resorted to within the scope of the invention, and portions of the improvements may be used without others.

Having thus described my invention, I claim:—

1. A hand held device for viewing in still state a series of stereoscopic images upon a perforated film tape, the device having a casing forming binoculars for said images, the device having a plate and a frame for receiving and guiding the film between them, said plate and frame having registering windows for the images, means on said plate to support said frame for slidable movement inwardly into a position of registry of said windows and outwardly from the device, means for limiting the movement of said frame to a stroke corresponding to the required extent of advancement of the film, said frame having a projection adapted to engage a perforation of the film to therewith advance the film when the frame is slid outwardly for obtention of the successive views thereof, said plate having a projection adapted to engage a perforation of the film to arrest it when the frame is slid inwardly, means to limit the inward and outward movements of said frame, and a finger-piece wherewith to actuate said frame.

2. A hand held device for viewing in still state a series of stereoscopic images upon a perforated film tape, the device having a casing forming binoculars for said images, the device having a plate and a frame for receiving and guiding the film between them, said plate and frame having registering windows for the images, means on said plate to support said frame for slidable movement inwardly into a position of registry of said windows and outwardly from the device, means for limiting the movement of said frame to a stroke corresponding to the required extent of advancement of the film, and said frame having a projection adapted to engage a perforation of the film to therewith advance the film when the frame is slid outwardly for obtention of the successive views thereof.

3. A hand held device for viewing in still state a series of stereoscopic images upon a perforated film tape, the device having a casing forming binoculars for said images, the device having a plate and a frame for receiving and guiding the film between them, said plate and frame having registering windows for the images, means on said plate to support said frame for slidable movement inwardly into a position of registry of said windows and outwardly from the device, means for limiting the movement of said frame to a stroke corresponding to the required extent of advancement of the film, said frame having a projection adapted to engage a perforation of the film to therewith advance the film when the frame is slid outwardly for obtention of the successive views thereof, and said plate having a projection adapted to engage a perforation of the film to arrest it when the frame is slid inwardly.

4. A hand held device for viewing in still state a series of stereoscopic images upon a perforated film tape, the device having a casing forming binoculars for said images, the device having a plate and a frame for receiving and guiding the film between them, said plate and frame having registering windows for the images, means on said plate to support said frame for slidable movement inwardly into a position of registry of said windows and outwardly from the device, means for limiting the movement of said frame to a stroke corresponding to the required extent of advancement of the film, said frame having a projection adapted to engage a perforation of the film to therewith advance the film when the frame is slid outwardly for obtention of the successive views thereof, said plate having a projection adapted to engage a perforation of the film to arrest it when the frame is slid inwardly, and means to limit the inward and outward movements of the frame.

MILTON KAHN.